William Murkland and John W. Murkland's Improvements in Looms.
No. 123,037.
10 Sheets—Sheet 6.
Patented Jan. 23, 1872.
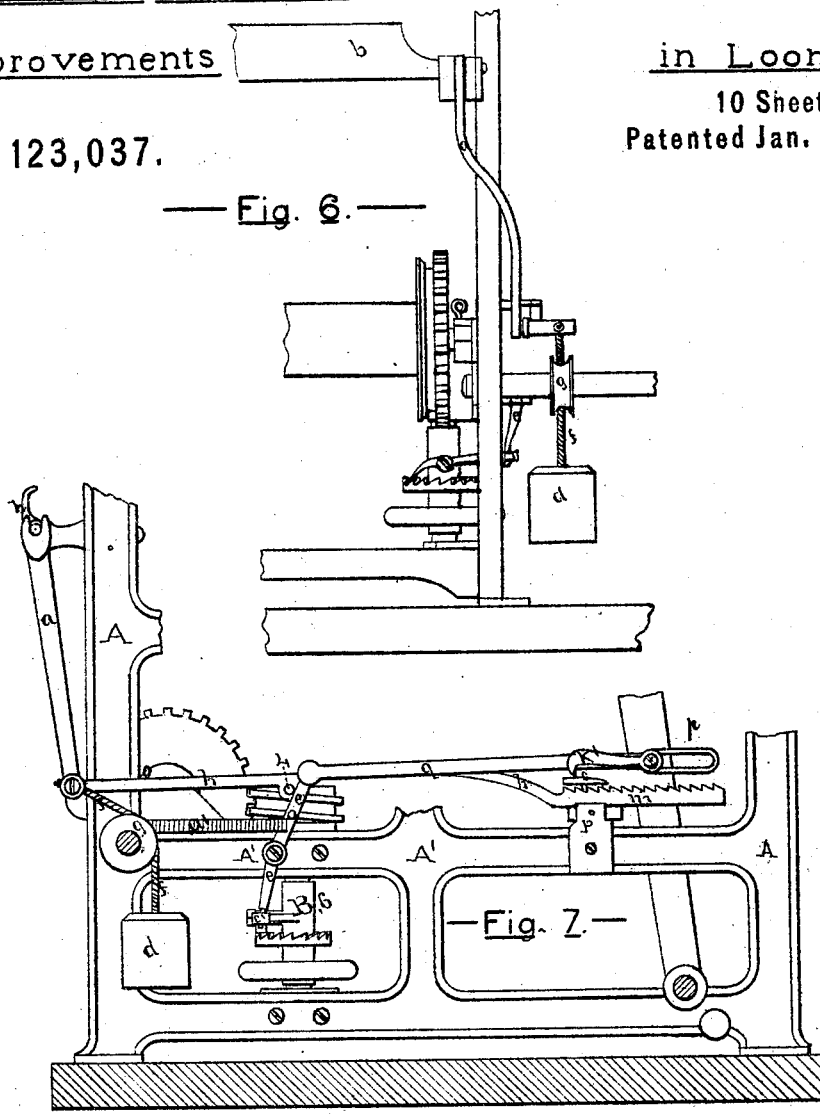
Fig. 6.
Fig. 7.
Witnesses
John E. Crane
A. A. Heart
Inventors
William Murkland
John W. Murkland
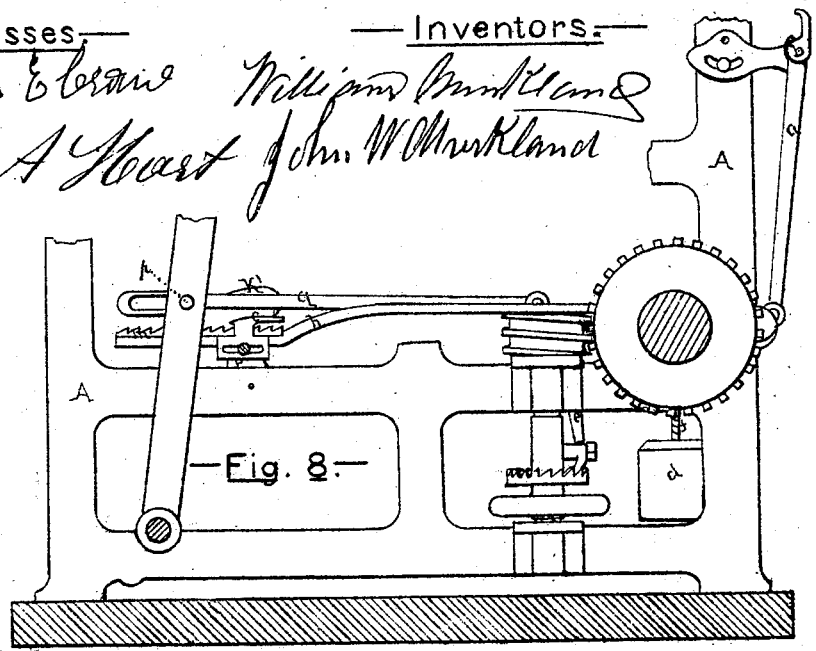
Fig. 8.

10 Sheets--Sheet 7.
No. 123,037. Patented Jan. 23, 1872.
William Murkland and John W. Murkland's
Improvements in Looms.
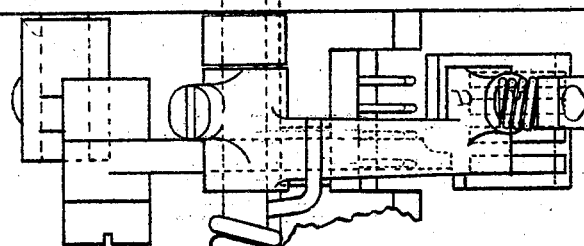
Fig. 9.
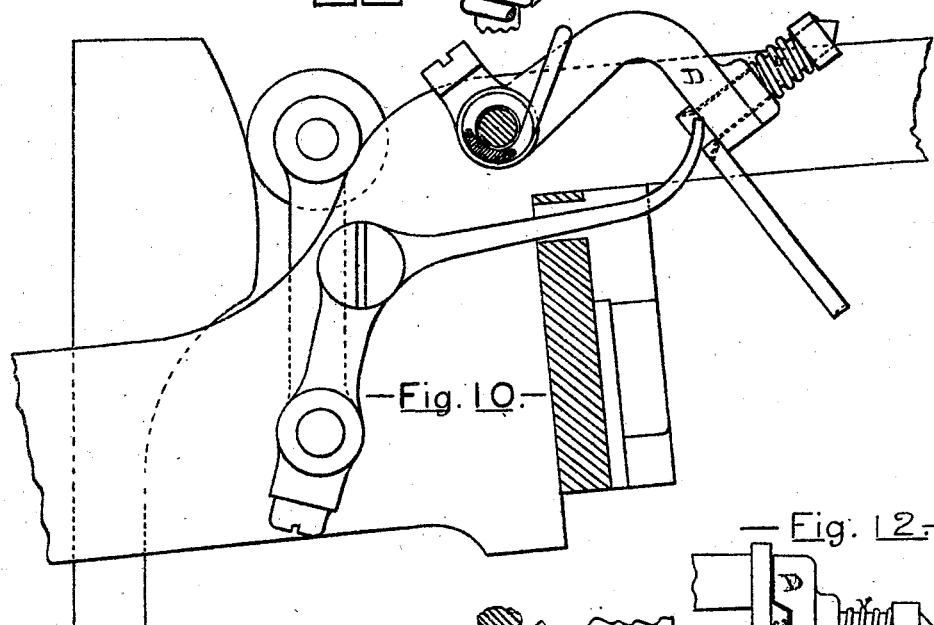
Fig. 10.
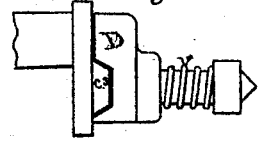
Fig. 12.
Witnesses
John E Crane
H A Hart
Inventors
William Murkland
John W Murkland
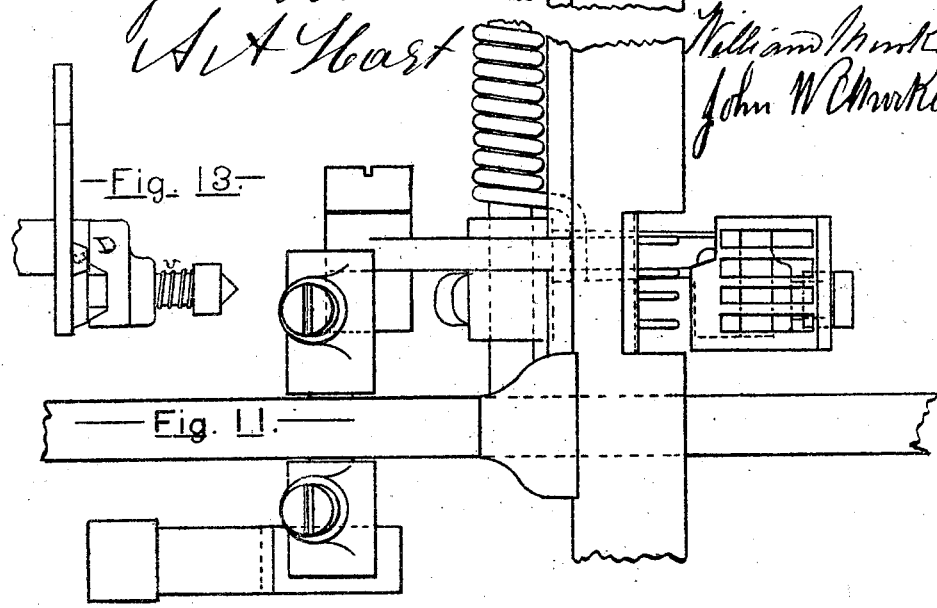
Fig. 13.
Fig. 11.

William Murkland and John W. Murkland's
Improvements in Looms.
10 Sheets--Sheet 8.
No. 123,037.
Patented Jan. 23, 1872.
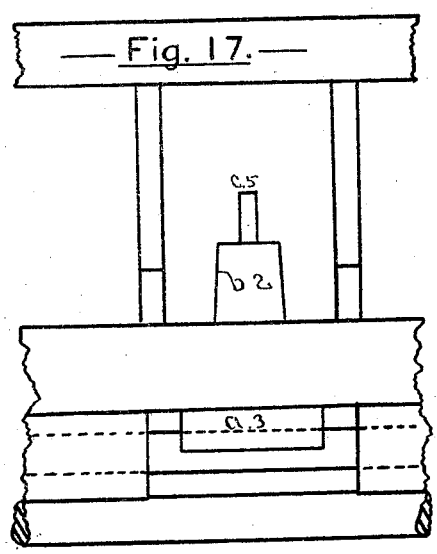
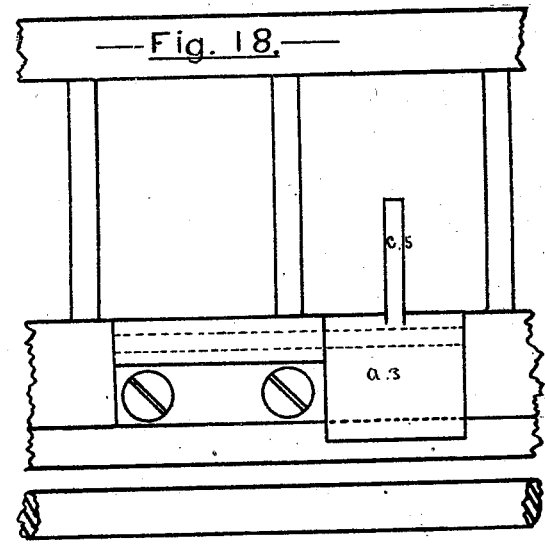
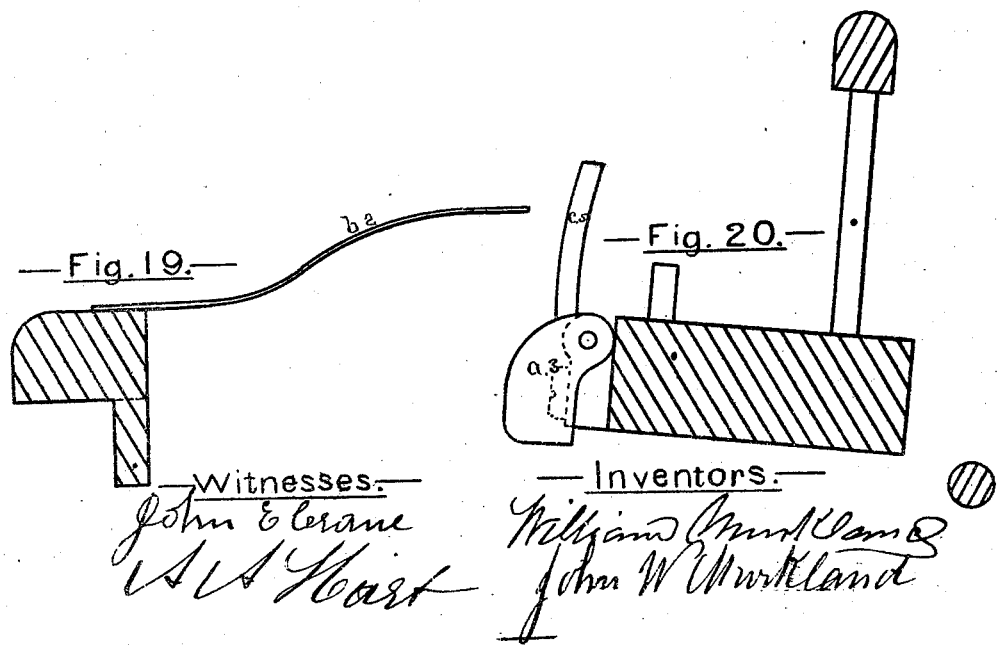
Witnesses.
John E. Crane
A. A. Hart
Inventors.
William Murkland
John W Murkland

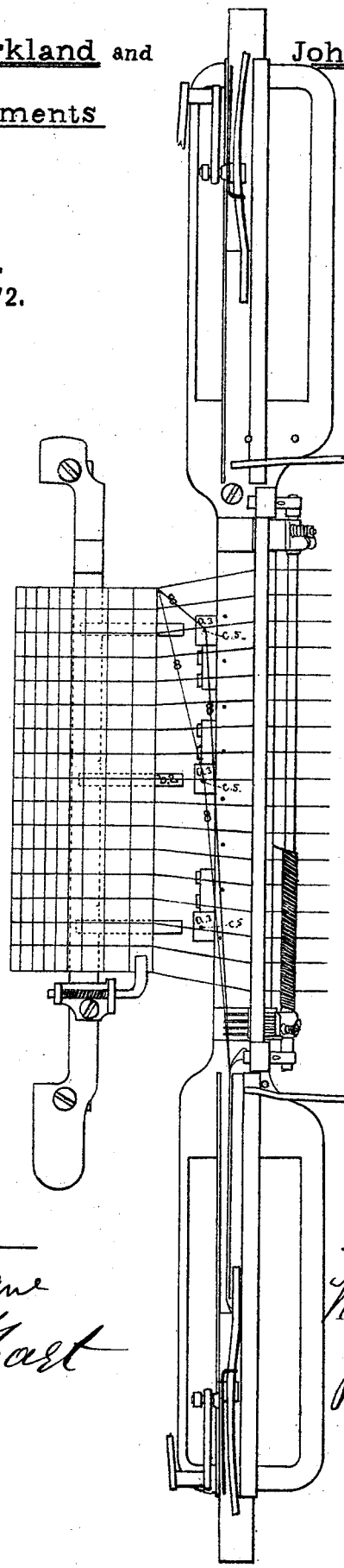

William Murkland and John W. Murkland's
No. 123,037.
Patented Jan. 23, 1872.
Improvements in Looms.
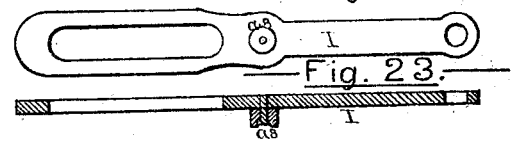
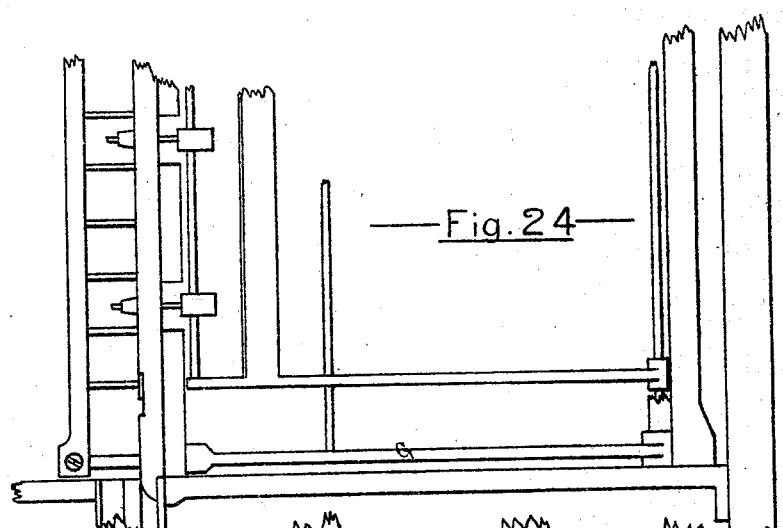
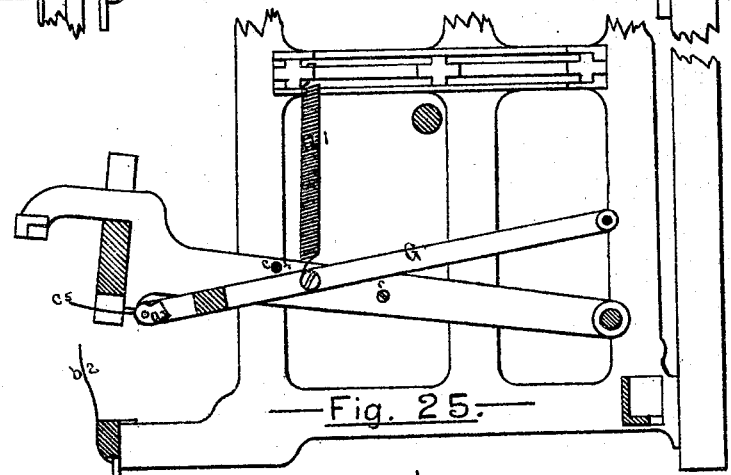

123,037

UNITED STATES PATENT OFFICE.

WILLIAM MURKLAND AND JOHN W. MURKLAND, OF LOWELL, MASS.

IMPROVEMENT IN LOOMS.

Specification forming part of Letters Patent No. 123,037, dated January 23, 1872.

*To all whom it may concern:*

Be it known that we, WILLIAM MURKLAND and JOHN W. MURKLAND, both of Lowell, in the county of Middlesex and State of Massachusets, have invented certain new and useful Improvements in Power-Looms, of which the following is a full, clear, and exact description, reference being had to the accompanying drawing making part of this specification, in which—

Figure 1:
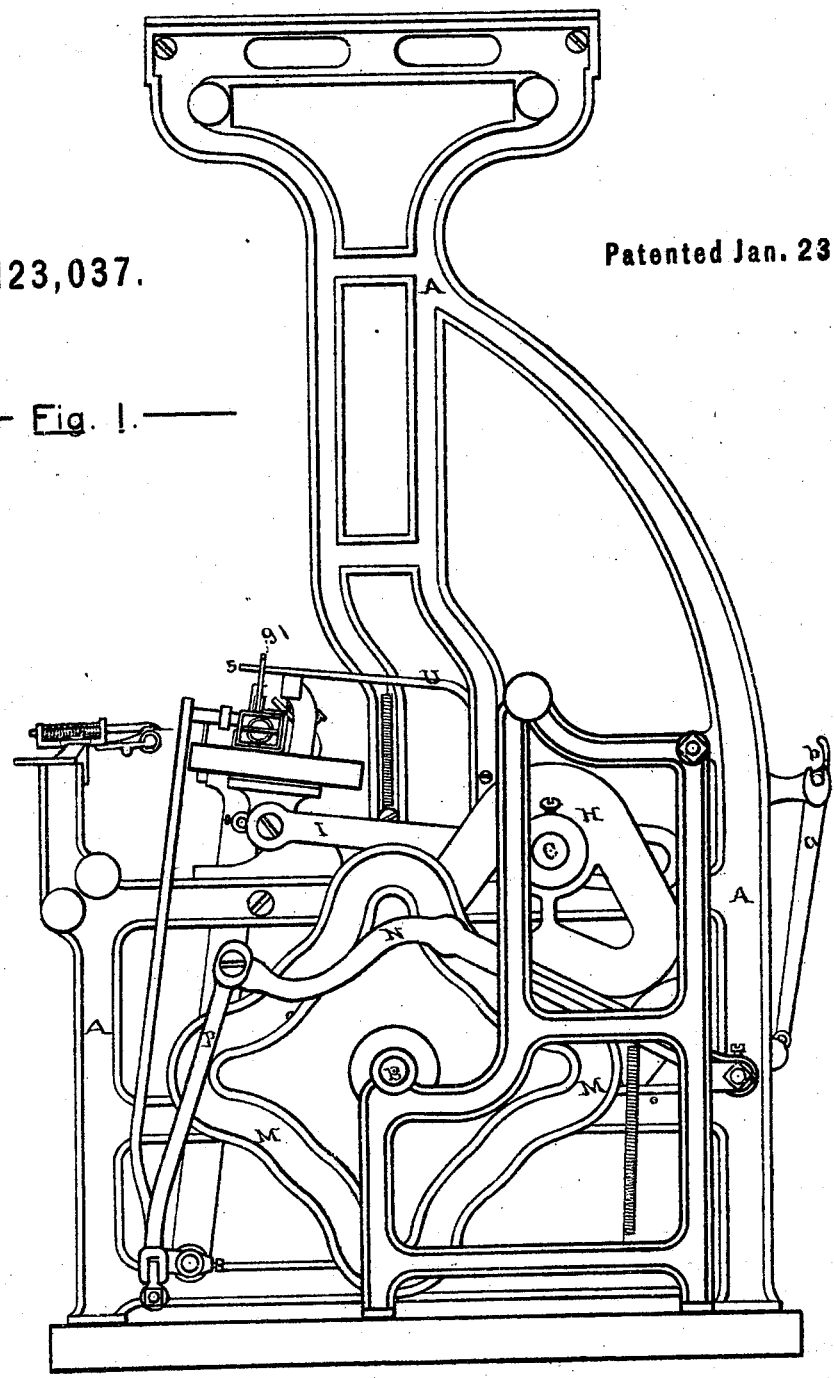
Figure 2:
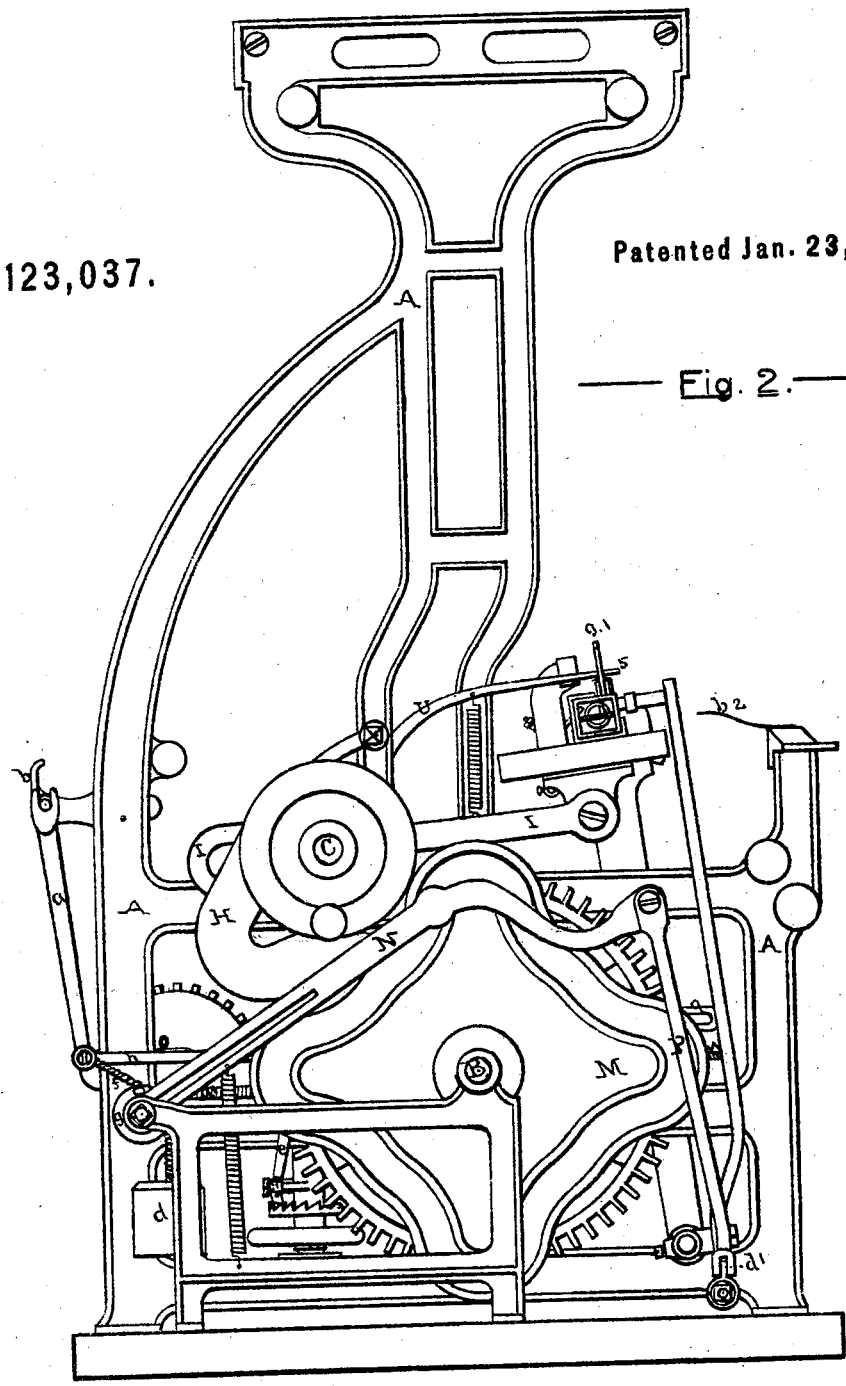
Figure 3:
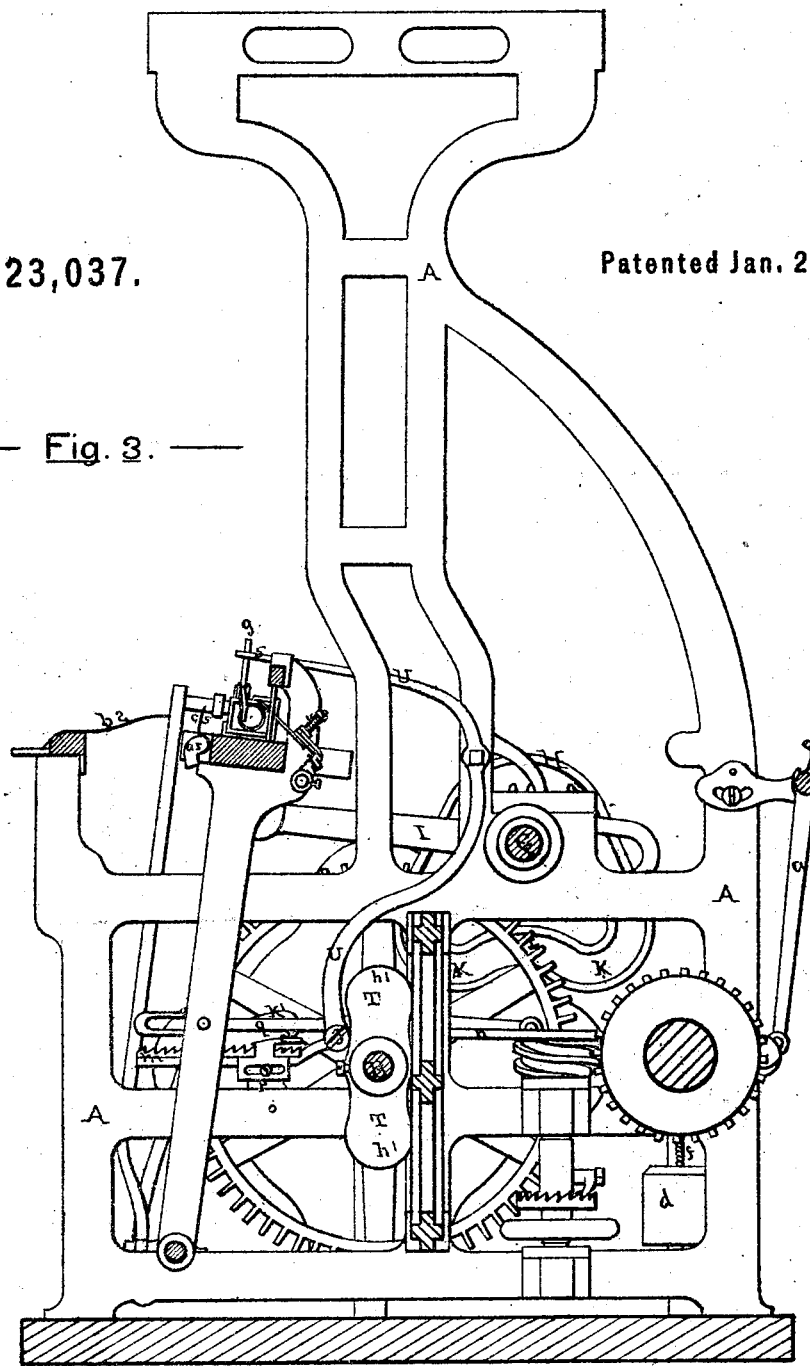
Figure 4:
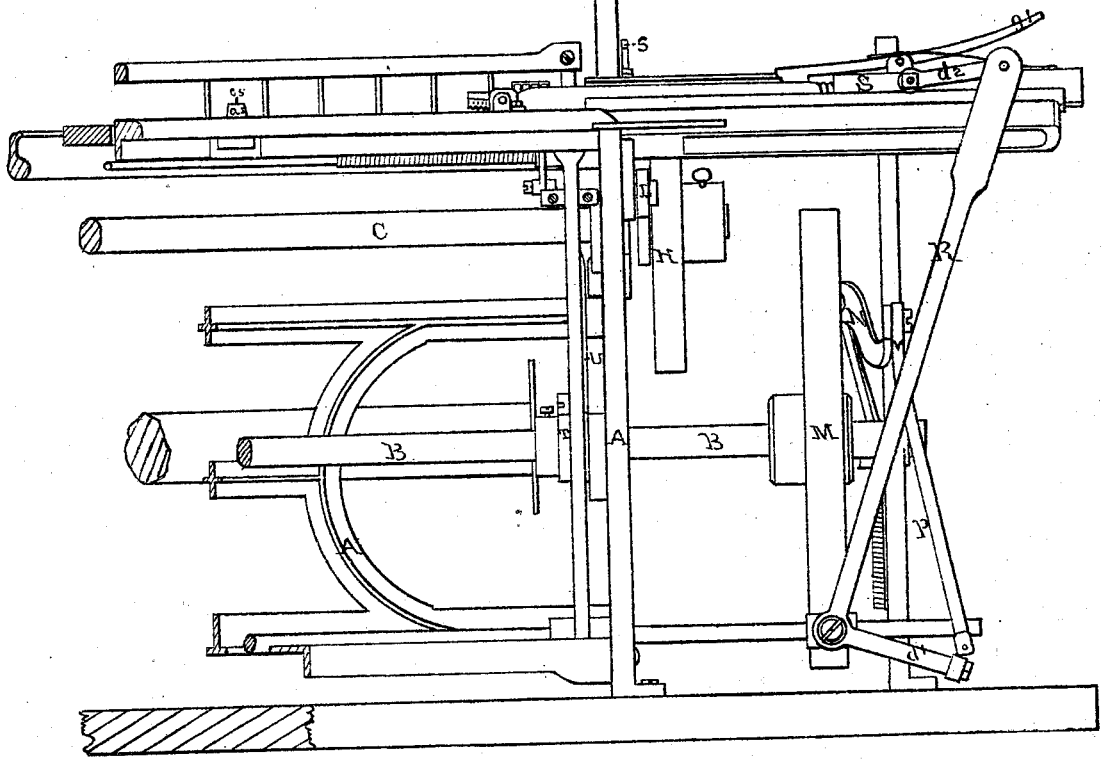
Figure 5:
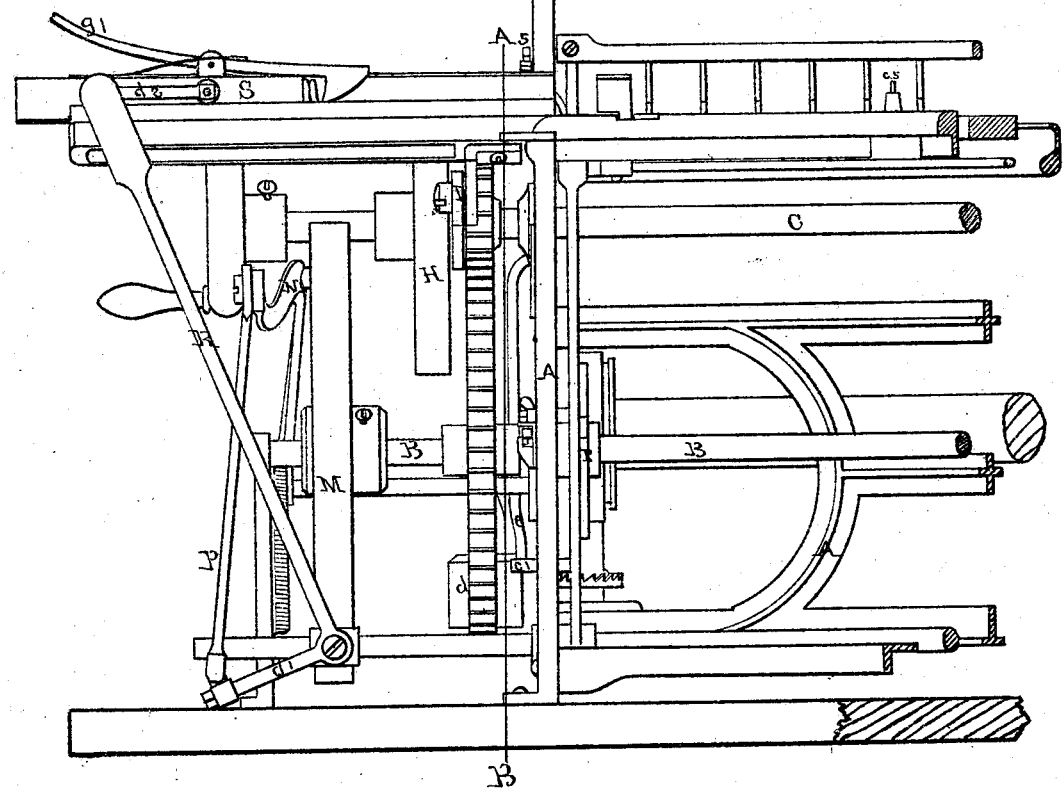

Figures 1 and 2 represent opposite end elevations; Fig. 3, a central transverse section. Figs. 4 and 5, taken together, constitute a front elevation. Fig. 6 represents a rear-side view of a portion of the loom at one end thereof, showing the operating end of the yarn-beam head, the tension-weight, the vibrating bar, and some other parts. Figs. 7 and 8 represent opposite end elevations of that part shown in Fig. 6, the former an outside and the latter an inside elevation, and the former on the line A B of Fig. 5. Fig. 9 represents a rear-side view of a portion of the latter, showing the grate and the filling-fork, the latter as raised to allow the shuttle to pass beneath it. Fig. 10 is an end view of the same, being a cross-section of the lathe a little inside of the fork. Fig. 11 is a front-side view of the parts shown in the two previously-described figures back of the breast-beam, or after the latter has been removed. Fig. 12 denotes a front view of the filling-fork, showing the adjustable and elastic or yielding jointed connection which causes the fork to automatically resume its position when temporarily displaced or swung round by the moving shuttle. Fig. 13 represents, also, a front view of the stand and fork, the latter as it appears after having been displaced beyond that point where the power of the spring would return it to its position, and from which position it should be replaced by the operator. Figs. 17 and 18 are each a front view of the central portion of the lathe, the latter after the breast-beam has been removed, showing the filling guide-pin or rocking-guide tension-holder or tumbling-finger used in our invention. Fig. 19 represents a cross-section of the breast-beam and the finger-operating shield, which, when the loom is weaving fabric, may be dispensed with, the web of cloth serving to operate the finger before it reaches the shield. Fig. 20 shows a cross-section of the lathe, the reed and its cap, and the tumbling-finger or guide, and the pivoted counter-balance stand, which holds it in position to catch the filling after the shuttle has passed the guide. Fig. 21 represents a plan or top view of the lathe and the breast-beam, with three several filling-guides in different positions, showing also the direction of the filling 8 from the selvage around such guide or guides and to the shuttle in a box at the end of the lathe. Figs. 22 and 23 represent different elevations of the slotted lever, connected with the lathe and slotted onto the shaft C, and provided with a roller, $a^8$, by which the cam H operates the lathe. Figs. 24 and 25 are modifications, representing means for connecting and operating the tumbling-fingers or filling tension-guides without attaching them with the lathe.

This invention relates to looms which are designed for weaving carpeting, matting, and other similar fabrics, and has for its object to cheapen and to simplify the construction and arrangement of parts or elements; to economize in the cost of the loom and in wear and tear, and, consequently, in the expense of repairs; to lessen the liability of breakage or displacement of some of the parts; and to insure the certain and uniform introduction of the filling and the clearing of the shreds. This invention consists, first, in an apparatus or combination of mechanisms for controlling and regulating the tension of the warp at and by the beat of the lathe, regardless of the tension or of the position of the vibrating bar or other device which guides the warp from the yarn-beam to the harnesses, and in certain other connected and operating mechanisms by which the delivery of the warp is regulated, some of the parts or combinations performing two or more functions. Second, our invention consists in a certain improvement in the filling-fork, viz., in a yielding or elastic joint or jointed connection where the fork is attached to the arm or stand which carries it, whereby accidental breakage or injury of the fork are prevented by the removal or replacing of shuttles or by other usual causes, and whereby the action of the blow of the fork on the filling is considerably softened. Fourth, our invention consists in the combination of the lathe-repeating mechanisms, or the mechanism which gives the lathe a double beat up or repeating action, and the mechanism which gives or imparts to the shuttle a positive movement, the shuttle-operating devices being operated by and from the shaft which operates the lathe by connecting mechanisms, viz., by gears which connect the cam-shaft B with the operating main shaft or lathe-shaft C, as hereinafter explained.

In constructing, applying, and using our said invention and improvements, the frame-work A, the cam-shaft B, the main shaft C, and the lathe are similar in many respects to those in our former invention patented November 23, 1869; but, as first stated, there is an apparatus or combination of mechanisms for controlling and regulating the tension of the warp at and by the beat of the lathe; and this combination of mechanisms consists of a lever, $a$, connected to the vibrating bar $b$, and to the lower end of the lever a weight, $d$, is suspended by a strap, $f$, passing over a roller, $g$, which gives the required tension to the warp. Attached to the lower end of the lever $a$ is a connecting-rod, $h$, on the opposite end of which is formed a toothed rack, $m$, which works in a grooved stand, $p$, and an adjustable shield, $c$, is connected with the upper end of said stand, covering a portion of the teeth of the rack. At each backward motion of the lathe the acting end of the pawl $k^1$, pivoted to the sword of the lathe, is released from contact with the rack by rising upon the shield, and at each forward motion of the lathe the pawl is drawn from the adjustable shield and allowed to engage with the rack and give it a forward motion, which, by means of the connecting-rod $h$, operates the lever $a$, and, through this, the tension-bar $b$, and thus tightens the warp at each beat of the lathe. The shield may be made adjustable by any well-known mechanical means, and movable forward and backward, so as to expose a requisite number of the teeth of the rack to the action of the pawl, and thereby increase or diminish the motion of the operating parts and of the vibrating bar, as the pattern or texture of the fabric may require. A connecting-lever, $q$, is slotted onto the stud or pivoting $p$ of the pawl, and its opposite end is pivoted to the top end of a lever, $e$, which swings upon a stud projecting from the girt $A^1$ of the frame. The lower depending end of said last-named lever enters a slotted arm, $c^1$, projecting from the vertical shaft of the let-off apparatus, as usual. Between the top end of the lever $e$ and its fulcrum a spring, $a^1$, is connected, and the tension of the spring is had by securing its opposite end to some support on the frame. By means of the stud $p$ on the sword of the lathe the slotted lever $q$ is operated, when the warp becomes tightened and requires to be let off, at each beat of the lathe, at which time the slotted lever $q$ receives a positive forward motion, which operates the lever $e$ in one direction and its lower connection with the let-off. When the warp is lax the arm $e$ is pressed forward by the stud 4 on the rod $h$ as the arm $a$ is moved forward by the weight $d$, in which position the slotted arm $q$ is not actuated by the lay at the beat-up, but as the warp is tightened the vibrating arm $a$ is moved backward, carrying the stud 4 away from the arm $e$, and thus allowing the spring $a$ to retract the arm $q$ and place it in position to be actuated by the lathe at the beat-up. By this means the tension of the warp controls the let-off. This connection of the two separate mechanisms last above described governs the delivery of warp, each mechanism performing its separate function, and both operating in connection, as described.

That part of our invention which relates to the filling-forks consists in the yielding or elastic joint or jointed connection, the parts being constructed, applied, and rendered operative as clearly shown in Figs. 9 to 13, inclusive, wherein the stand D, which carries the fork, and the latter are connected by a bolt having a spring, $v$, between the nut and the stand to give the fork its yielding action, the fork being otherwise held in position by a rising lip or tongue, $c^3$, thereon, fitting into a groove in the lower side of the stand.

If a shuttle or other object strikes the fork an ordinary blow, instead of breaking or injuring it the spring $v$ yields to the force of the blow, and the fork instantly rises and swings laterally, but immediately returns to its proper position by the beveled or inclined edges of the tongue and groove sliding together. The fork is capable of yielding and moving in any direction by force exerted against it, and if only ordinary force is exerted it readily returns to its proper position.

That part of our machine which relates to the tumbling-fingers or filling tension-guides consists of one or more rocking stands, $a^3$, each provided with a rising finger or guide, $c^5$, and pivoted to the front of the lathe-sill or to a bar on the top of two rocking levers, G, operated by the lathe-swords or by projecting studs $c^4$ and by a spring, $G^1$, as clearly shown in Figs. 24 and 25, the lathe-swords and the stud giving one motion and the spring the opposite motion. This last-described mechanism is a modification of that last above described, and an obvious substitute or equivalent means for connecting and operating the filling tension-guide or guides, each of which may be set at any suitable distance from the temples; and if only one is used, this is set at the center of the lathe.

The operation of the tumbling-finger or fingers is as follows: When the lathe recedes each stand $a^3$ swings upon its pivot by the weight of the stand, which brings the finger into a vertical position and ready for the passage of the shuttle between it and the reed, which shuttle carries the filling from its eye back of the finger and holds it at any desired angle from the selvage to the finger, and from this in a line nearly parallel with the line of the lathe, thus holding the filling in the proper line to be acted upon by the falling forks, the filling being drawn by the shuttle at any desired tension to form an even selvage on the fabric. As the lathe moves forward the filling becomes slackened by the change of the angles at which it was held, and at the same time the finger passes under and in contact with the shield $b^2$ or with the woven fabric, and is withdrawn from the web and released from the filling, thus relieving the reed and the temples from the usual great lateral strain thereon, and forming the fabric nearly or quite the entire width of the warp. The direction and the angles of the filling 8 from the selvage to and around the finger or fingers are clearly shown in Fig. 21. When it is desired to weave the fabric the full width of the warp the fingers are arranged nearer the selvage—one of such fingers at each side of the warp.

That part of our invention relating to the repeating lathe and the positive-motion shuttle has reference to the combination of those operating mechanisms and to the mechanism which produces the double beat or repeating action, the latter consisting of certain grooved cams, H, constructed as shown, and arranged upon the main shaft C, and acting upon connecting-rods or levers I, slotted onto the shaft and connected with the lathe, the cams being constructed with two eccentric operating or pressing points, K, and a depression, L, between them. At each revolution of the shaft C and the cams the two eccentric points K of each cam act alternately upon the roll $a^3$ of the slotted lever I, which produces the double beat or repeating action of the lathe. Either of the eccentric or operating points K of the cams H may be varied, and one extend beyond the other, so as to produce one full beat and one partial beat, which in some cases may be preferable, as the repeating action is intended for clearing the sheds and for more thoroughly beating up the filling, and by giving the second beat the greater amount of force or a more forcible blow we produce a fabric more firm and of a closer texture, since the second beat of the lathe takes place on the cross-shade, or as the new shade is formed.

The other part of the combination before referred to consists of two quadrangular grooved cams, M, constructed as shown, and arranged upon the cam-shaft B at opposite ends of the loom. Each cam M operates a lever, N, pivoted to the rear side of the loom and extending forward to nearly under the shuttle-box, where a link, P, is connected. The lower end of this link is attached to an arm, $d^1$, projecting from the lower end of the picker-staff R, and the top end of the staff is loosely united with a link, $d^2$, which is pivoted to and traverses the shuttle-driver or carrier S. On the cam-shaft B are other two cams, T, having opposite horns $h'$, which operate a curved lever, U, pivoted at 3 to the frame. The upper end 5 of each lever U extends forward over the shuttle-driver and over the outer end of the lever $g'$ of the hook, which draws the shuttle at the time the two drivers are nearest together and the shuttle is being changed from one to the other. The cams T are set in opposite directions, so that when one is vertical the other is horizontal, so as to operate the curved levers U alternately for the alternate depression of the shuttle-hook levers $g'$ as the hooks alternately release and engage with the shuttle and carry or draw it through the web, both the lathe and the shuttle receiving their alternate or successive motions or movements by and from the shaft C and the connecting mechanisms.

In weaving rattan matting or other very coarse fibers on a power-loom (this loom being designed as much or more for such work than for any other) it is necessary that the lathe should have a repeating action, in order to clear the sheds or shades, which is done by the reed mounted on the lathe. A single movement of the reed, or simply passing the reed once through the harsh, stringy fibers of the warp-threads, is not sufficient; but a second movement of the reed between such warp-threads is found to be sufficient to separate them and allow them to pass each other and to open or divide (or, in other words, to clear the sheds,) and form a passage for the ponderous shuttle, which, in order to pass through such web, must be forced or carried by a positive movement—that is, by mechanisms which thus move or carry the shuttle. Both the repeating lathe and the positive-motion shuttle, or the specified combination of mechanisms which operate them successively, have been found necessary in successfully producing rattan matting on the power-loom. It is necessary that the pressing-points K of the cams H on the shaft C should be so set or adjusted, with special reference in the matter of time to the crossing of the warp-threads and the formation of the successive new sheds, that each second beat of the lay shall occur or take place on the cross-shed, or as the new shed is being formed, so that each last-inserted filling-thread shall be secured by the warp-threads crossed in front of it, and in time for the second beat of lay and the reed to force such secured filling well back against the preceding filling, where it will be held by the previously-crossed warp-threads to receive the second beat, thus forming more firm fabric and of closer texture than by the well-known process of beating up the filling in an open shed.

We consider the above-described process and mode or means of introducing, retaining, and beating up filling both new and useful, especially when the mechanism which produces such alleged new result (as in the present instance) is connected and operated in combination with the mechanism which produces or imparts a positive motion to the shuttle which carries and lays such filling. This combination of a double-beating lathe and a positive-motion shuttle is for the special purpose of weaving coarse, heavy, fibrous material, such as rattan matting and other long, coarse, fibrous substances used for such purposes, and several shuttles may be used by applying additional boxes, or by changing the shuttles by hand.

We claim as our invention—

1. The combination, substantially as described, of the rack $m$, pawl $k^1$, and the shield $c$ with connecting-rod $h$, the lever $a$, and the vibrating bar $b$, all constructed, arranged, and operating substantially in the manner and for the purpose set forth.

2. In combination with the vibrator $b$ and rod $a$ and the let-off mechanism, the rod $h$, having the rack $m$ and stud 4, with the levers $q$ and $e$, actuated by the lathe and the pawl $k^1$ and shield $c$.

3. The elastic or yielding jointed connection of the filling-fork with the stand which carries it, for the purpose and in the manner substantially as described.

4. The combination of the lathe-repeating mechanism, operating to clear the sheds and to more thoroughly beat up the filling, as set forth, and the mechanisms which produce or impart a positive motion to the shuttle, the latter receiving motion from the former or its shaft C by connecting mechanisms, and all arranged and operating in the manner and for the purpose herein specified.

WILLIAM MURKLAND.
JOHN W. MURKLAND.

Witnesses:
JOHN E. CRANE,
A. A. HART.